(12) United States Patent
Feiereisel et al.

(10) Patent No.: US 7,451,049 B2
(45) Date of Patent: Nov. 11, 2008

(54) AUTOMATIC DELAYS FOR ALIGNMENT OF SIGNALS

(75) Inventors: Neil S. Feiereisel, Cedar Park, TX (US); Craig M. Conway, Leander, TX (US)

(73) Assignee: National Instruments Corporation, Austin, TX (US)

( * ) Notice: Subject to any disclaimer, the term of this patent is extended or adjusted under 35 U.S.C. 154(b) by 951 days.

(21) Appl. No.: 10/801,103

(22) Filed: Mar. 15, 2004

(65) Prior Publication Data
US 2005/0190875 A1    Sep. 1, 2005

Related U.S. Application Data

(60) Provisional application No. 60/548,290, filed on Feb. 27, 2004.

(51) Int. Cl.
*G06F 19/00* (2006.01)
(52) U.S. Cl. .............. 702/68; 324/76.11; 702/57; 702/66; 702/67; 702/89
(58) Field of Classification Search .......... 324/76.11; 702/1, 57, 66, 69, 70, 79, 85, 89, 90, 107, 702/127, 176, 189, 67, 68
See application file for complete search history.

(56) References Cited

U.S. PATENT DOCUMENTS

| | | | | |
|---|---|---|---|---|
| 2,591,738 A | * | 4/1952 | Spencer | 324/102 |
| 2,768,348 A | * | 10/1956 | Grumet et al. | 368/117 |
| 2,887,653 A | * | 5/1959 | Myers | 368/118 |
| 2,896,160 A | * | 7/1959 | Kronacher | 368/118 |
| 2,994,822 A | * | 8/1961 | Isley, Jr. | 368/113 |
| 3,070,305 A | * | 12/1962 | Chiang | 708/682 |
| 3,866,126 A | * | 2/1975 | Cebula et al. | 368/118 |

(Continued)

FOREIGN PATENT DOCUMENTS

JP          61-14580 A    *    1/1986

OTHER PUBLICATIONS

National Instruments, "High-Speed Arbitrary Waveform Generator," DAQArb 5411 User Manual, Jun. 1997 Edition, Part No. 321558A-01, (2 pages).

(Continued)

*Primary Examiner*—Edward R Cosimano
(74) *Attorney, Agent, or Firm*—Meyertons Hood Kivlin Kowert & Goetzel, P.C.; Jeffrey C. Hood

(57) ABSTRACT

In one embodiment, a system comprises a delay determining unit that may be operable to determine a relative delay between the first signal provided by the first source and the second signal provided by the second source, based upon a travel path of the first signal and a travel path of the second signal. In addition, a delay circuit, comprised within the waveform generator, may be configured to be programmed to delay output of the first signal to output the first signal at a predetermined position with respect to output of the second signal, based on the determined relative delay. More specifically, in one embodiment, the delay circuit may be configured to be automatically programmed to add the relative delay to the output of the first signal to automatically align the output of the first signal with respect to the output of the second signal.

52 Claims, 9 Drawing Sheets

U.S. PATENT DOCUMENTS

| | | | | |
|---|---|---|---|---|
| 4,569,599 | A * | 2/1986 | Bolkow et al. | 368/120 |
| 4,942,561 | A * | 7/1990 | Ohishi et al. | 368/118 |
| 5,201,061 | A * | 4/1993 | Goldberg et al. | 455/503 |
| 5,253,243 | A * | 10/1993 | Suzuki | 369/47.28 |
| 5,406,198 | A * | 4/1995 | Orihashi et al. | 324/158.1 |
| 5,438,259 | A * | 8/1995 | Orihashi et al. | 324/158.1 |
| 5,633,709 | A * | 5/1997 | Ohtaki et al. | 356/73.1 |
| 6,252,890 | B1 * | 6/2001 | Alger-Meunier et al. | 370/503 |
| 6,556,934 | B2 * | 4/2003 | Higashide | 702/89 |
| 6,865,496 | B2 * | 3/2005 | Camnitz et al. | 702/69 |
| 7,099,792 | B2 * | 8/2006 | Giral et al. | 702/123 |
| 7,177,777 | B2 * | 2/2007 | Giral et al. | 702/119 |
| 2002/0013672 | A1 * | 1/2002 | Higashide | 702/89 |
| 2003/0081667 | A1 * | 5/2003 | Camnitz et al. | 375/226 |
| 2003/0125897 | A1 * | 7/2003 | Higashide | 702/118 |
| 2005/0190875 | A1 * | 9/2005 | Feiereisel et al. | 375/356 |
| 2006/0074584 | A1 * | 4/2006 | Giral et al. | 702/119 |
| 2006/0085157 | A1 * | 4/2006 | Giral et al. | 702/119 |
| 2006/0150019 | A1 * | 7/2006 | Yamazaki et al. | 714/30 |
| 2007/0011634 | A1 * | 1/2007 | Negishi | 716/6 |

OTHER PUBLICATIONS

The Sony Tektronix, "Arbitrary Waveform Generator." User Manual VX4792, Copyright 1994, 1995, (5 pages).

Rohde & Schwarz, "I/Q Modulation Generator," AMIQ Operating Manual, Test and Measurement Division, Copyright 2003, 2004, (10 pages).

Rohde & Schwarz, "Vector Signal Generator R&S SMU200A" Version 02.00 Jun. 2004 (3 pages).

Rohde & Schwarz, "Vector Signal Generator R&S SMU200A CE," Operating Manual, vols. 1 & 2 1141.2005.02, Jun. 4, 2004, (6 pages).

Agilent Technologies, "Agilent N6030A Arbitrary Waveform Generator 1.25 GS/s, 15 Bit," Technical Overview, Copyright 2003, 2004, (3 pages).

Agilent Technologies, "Agilent Technologies announces industry's first arbitrary Waveform Generator to Offer Wide Bandwidth, Wide Dynamic Range Signals simultaneously," ://agilent.com/about/newsroom/presrel/2004/20sep2004b.html, Sep. 20, 2004, (2 pages).

* cited by examiner

AUTOMATIC DELAYS FOR ALIGNMENT OF SIGNALS

PRIORITY CLAIM

This application claims benefit of priority of now expired U.S. provisional application Ser. No. 60/548,290 titled "Automatic Delays for the Alignment of Data and Digital Markers", filed Feb. 27, 2004, and whose inventors are Neil S. Feiereisel and Craig M. Conway.

BACKGROUND OF THE INVENTION

1. Field of the Invention

This invention relates to signal generation and, more particularly, to signal generation with automatic delays for alignment of signals from multiple sources.

2. Description of the Related Art

Signal generation is used in a wide variety of applications, including, for example, industrial testing and verification, product design, and control, among others. In one application of signal generation, a signal is generated according to waveform data, and provided as input or stimulus to a unit under test (UUT). Resulting output from the UUT may then be analyzed to characterize the UUT, e.g., for quality control, design feedback, etc. Generally, waveform generators are used to generate such signals.

Waveform generators may be used to produce one or more waveforms having defined characteristics. A waveform is a graphical representation of a signal, for example, an analog data signal or a digital data signal. The graphical representation may be a plot of amplitude (e.g., voltage) versus time. Therefore, a waveform representing an analog signal may comprise continuous and varying amplitude plots with respect to time (e.g., a sinusoidal wave), and a waveform representing a digital signal may comprise one or more pulses or discrete amplitude plots with respect to time (e.g., a binary pattern).

Waveform generators may be stand-alone systems or computer-based systems. In addition, waveform generators, also called signal sources, may be classified into two general types of waveform generators: arbitrary waveform generators and digital waveform generators. Arbitrary waveform generators are primarily used in analog and mixed-signal applications. Digital waveform generators, also called logic signal sources, include two classes of instruments: pattern generators and pulse generators. Logic signal sources are primarily used in digital system applications, for example, to provide stimulus signals, such as digital data patterns.

Waveform generators may generate waveforms by several methods. For example, waveform generators may create a waveform in response to a user input based on a plurality of waveform definitions. Additionally, waveform generators may create waveforms by receiving an existing signal and reproducing the signal. Furthermore, waveform generators may modify an existing signal. After creating, reproducing, and/or modifying a signal, waveform generators may output the one or more analog or digital signals.

Besides the main analog or digital outputs, waveform generators may also generate one or more ancillary digital signals called markers. The digital marker may be placed at an arbitrary location with respect to the waveform provided by the waveform generator, for example, at a specified sample number location. For example, arbitrary waveform generators may use sampling techniques to produce an analog waveform. Therefore, the analog waveform may comprise a plurality of samples or sample points. In this example, when the analog signal output corresponds to a sample point specified by the digital marker, the digital marker signal should ideally appear on the arbitrary waveform generator's digital marker input/output (I/O) terminal coincident with the sample point of the analog signal appearing on the analog I/O terminal.

Digital markers may be used in numerous applications. For example, an arbitrary waveform generator may send an analog signal to a UUT, and may trigger another device, such as a high-speed digitizer, with the digital marker. In this example, the digital marker, which may be relatively aligned with the first sample of the arbitrary waveform generator, may cause the digitizer to start digitizing the output of the UUT.

In some arbitrary waveform generators, a portion of the digital data may be used to store or specify digital markers. For example, if the system includes 16 bits of digital data, and only 14 of the digital bits are required to generate or define the analog signal, the remaining two bits may not be fed to the digital-to-analog converter (DAC); instead the extra bits may be used to generate the digital markers. In some cases, the lines including the two extra bits are connected straight to the I/O terminals to output the digital markers. In this example, the 14 bits may be fed through a DAC to create an analog signal and the analog signal may pass through other analog components, such as amplifiers and analog filters, before the analog signal is output. Therefore, the output of the analog signal may be delayed in time with respect to the output of the digital markers, since the DAC and the other components in the travel path associated with the analog signal delay the output of the analog signal.

The alignment of digital marker signals with data signals is difficult in practice. One possible solution is to manually account for the delay in the data signal when specifying the digital marker position. For example, in an arbitrary waveform generator, if it were determined that the digital marker is arriving at the I/O terminal 14 samples before the analog signal, and the desired digital marker position is at sample number 0 of the analog signal, the digital marker position could be specified as sample number 14 instead to achieve the desired result. However, this may be an inconvenience to the user and may still lead to unexpected, inaccurate results. For example, even if the user were able to empirically deal with an alignment problem for a particular group of settings, the user may face a different mismatch when the settings are changed, for example, by turning on an analog filter or changing an interpolation rate. The user may not notice the additional mismatch, since the user previously aligned the digital marker with the data signal.

In the past, when sampling rates were much lower, the delays between the output of digital markers and data signals were often tolerable. However, with current sample rates, the delays may pose a significant problem, and as sampling rates increase, for example, from 100 MHz (10 ns per sample) to 200 MHz (5 ns per sample) and higher, the delay issue will become even more important.

The same issues described above with regard to aligning digital marker signals with waveform signals also apply to the more general case of aligning waveforms or other signals from multiple sources.

SUMMARY OF THE INVENTION

Various embodiments of a system and method are disclosed for delaying the output of a first signal provided by a first source with respect to the output of a second signal provided by a second source. In one embodiment, a system comprises a delay determining unit that may be operable to determine a relative delay between the first signal provided by the first source and the second signal provided by the second source, based upon a travel path of the first signal and a travel path of the second signal. In addition, a delay circuit, comprised within the waveform generator, may be configured to be programmed to delay output of the first signal to output the first signal at a predetermined position with respect to output of the second signal, based on the determined relative delay.

In one embodiment, the method for delaying output of a first data signal with respect to output of a second data signal comprises automatically programming the delay circuit to add the relative delay to the output of the first signal to automatically align the output of the first signal with respect to the output of the second signal.

In one embodiment, the method for delaying output of a first data signal with respect to output of a second data signal further comprises receiving a user input indicating an additional delay to program the delay circuit to add the determined relative delay plus the additional delay to the output of the first signal to output the first signal at a predetermined position with respect to the output of the second signal.

In one embodiment, the method for delaying output of a first data signal with respect to output of a second data signal further comprises receiving a user input reducing the determined relative delay to program the delay circuit to add the reduced relative delay to the output of the first signal to output the first signal at a predetermined position with respect to the output of the second signal.

In one embodiment, the first source is a first output terminal of a waveform generator, which is associated with the travel path of the first signal, and the second source is a second output terminal of the waveform generator, which is associated with the travel path of the second signal. In another embodiment, the first source is a first output terminal of a first waveform generator and the second source is a second output terminal of a second waveform generator. In one embodiment, the first signal is a digital marker signal and the second signal is a data signal. In one embodiment, the first and second signals are data signals.

Figure 1A:
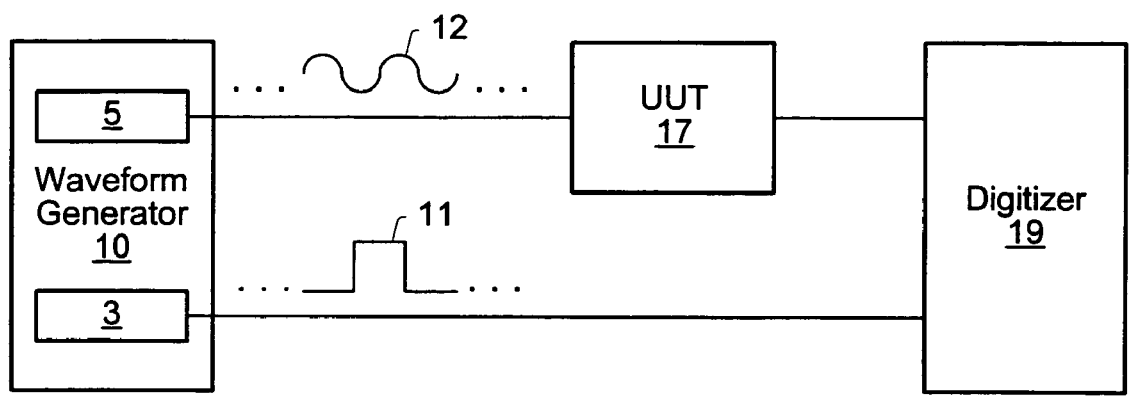
FIG. 1A illustrates a block diagram of one embodiment of a waveform generator for generating a plurality of signals.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

GLOSSARY OF TERMS

Memory Medium—Any of various types of memory devices or storage devices. The term "memory medium" is intended to include an installation medium, e.g., a CD-ROM, floppy disks 94, or tape device; a computer system memory or random access memory such as DRAM, DDR RAM, SRAM, SDRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as signals such as electrical, electromagnetic, or digital signals, conveyed via a communication medium such as a bus, network and/or a wireless link.

Programmable Hardware Element—includes various types of programmable hardware, reconfigurable hardware, programmable logic, or field-programmable devices (FPDs), such as one or more FPGAs (Field Programmable Gate Arrays), or one or more PLDs (Programmable Logic Devices), such as one or more Simple PLDs (SPLDs) or one or more Complex PLDs (CPLDs), or other types of programmable hardware. A programmable hardware element may also be referred to as "reconfigurable logic".

Medium—includes one or more of a memory medium, carrier medium, and/or programmable hardware element; encompasses various types of mediums that can either store program instructions/data structures or can be configured with a hardware configuration program. For example, a medium that is "configured to perform a function or implement a software object" may be 1) a memory medium or carrier medium that stores program instructions, such that the program instructions are executable by a processor to perform the function or implement the software object; 2) a medium carrying signals that are involved with performing the function or implementing the software object; and/or 3) a programmable hardware element configured with a hardware configuration program to perform the function or implement the software object.

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

DETAILED DESCRIPTION

Aligning Signals from Multiple Sources

FIG. 1A illustrates a block diagram of one embodiment of a waveform generator 10 for generating a plurality of signals. In one embodiment, waveform generator 10 may be a standalone waveform generator or a computer-based waveform generator. Furthermore, waveform generator 10 may be an arbitrary waveform generator or digital waveform generator (i.e., logic signal source). In one embodiment, waveform generator 10 may be configured to align signals from multiple sources.

In one embodiment, waveform generator 10 may be operable to delay output of a first signal 11 provided by a first source 3 with respect to output of a second signal 12 provided by a second source 5. In one embodiment, waveform generator 10 may comprise a delay determining unit that may be operable to determine a relative delay between the first signal 11 and the second signal 12, based upon a travel path via source 3 of the first signal 11 and a travel path via source 5 of the second signal 12. In one embodiment, the delay determining unit may be further operable to program a delay circuit comprised in the first source 3, based on the determined relative delay, to delay the output of the first signal 11 to output the first signal 11 at a predetermined position with respect to the output of the second signal 12. More specifically, in one embodiment, the delay determining unit may be operable to automatically program the delay circuit to add the relative delay to the output of the first signal 11 to automatically align the output of the first signal 11 with respect to the output of the second signal 12. It is noted that in one embodiment the travel path of a signal may also include, for example, processing of the signal prior to conversion to an analog signal. In one embodiment, the travel path of a signal may be the total path involved in the generation of the signal.

In the embodiment illustrated in FIG. 1A, waveform generator 10 is an arbitrary waveform generator, and the second signal 12 is an analog signal and the first signal 11 is a digital marker signal. In this embodiment, waveform generator 10 may send the analog signal (e.g., the second signal 12) to stimulate a UUT 17, and may trigger another device, such as a high-speed digitizer 19, with the digital marker signal (e.g., the first signal 11).

Figure 1B:
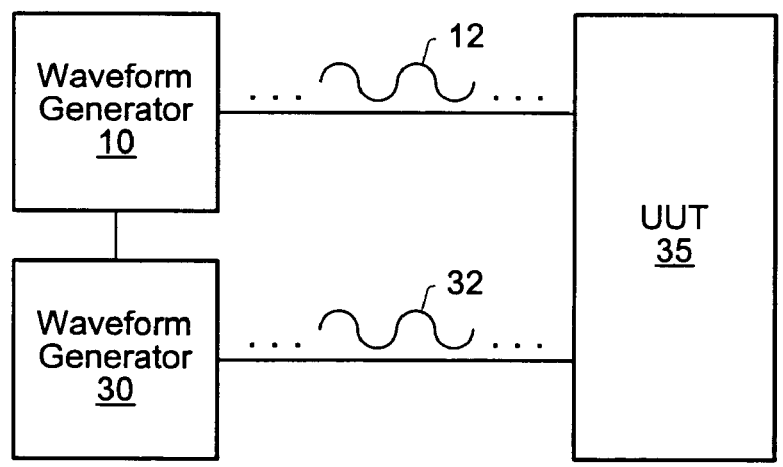
FIG. 1B illustrates a block diagram of one embodiment of a system comprising waveform generator and a waveform generator for generating a plurality of signals.

FIG. 1B illustrates a block diagram of one embodiment of a system comprising waveform generator 10 and a waveform generator 30 for generating a plurality of signals. It is noted that, as described above, each of waveform generators 10 and 30 may be any type of waveform generator. In one embodiment, the system may be operable to align signals from multiple sources. For example, in one embodiment, the system may be operable to align the output of a second signal 12 (e.g., an analog signal) provided by a first source (e.g. waveform generator 10) and the output of a third signal 32 (e.g., an analog signal) provided by a second source (e.g., waveform generator 30).

In the embodiment illustrated in FIG. 1B, waveform generators 10 and 30 may be coupled together and may both be further coupled to a UUT 35. In one embodiment, some tests may require the UUT 35 to be stimulated by multiple signals simultaneously, even though the signals may have different signal characteristics. Therefore, in one embodiment, the system may comprise a delay determining unit which may be operable to determine a relative delay between the second signal 12 provided by waveform generator 10 and the third signal 32 provided by waveform generator 30, based upon a travel path of the second signal 12 and a travel path of the third signal 32. Furthermore, in one embodiment, the delay determining unit may be operable to program a delay circuit, based on a determined relative delay, to align the output of the second signal 12 with the output of the third signal 32 to test UUT 35.

The two examples of signal alignment from multiple sources, which are described above with reference to FIGS. 1A and 1B, are further described below with reference to FIG. 3-8. Note, however, that these signal alignment examples are meant to be exemplary only, and are not intended to limit the methods disclosed herein to any particular application domain. Rather, the techniques described herein are contemplated for use in a wide variety of applications, e.g., as described below with reference to FIGS. 2A and 2B, including, for example, synchronized motion control, synchronized measurement and data acquisition, and synchronized modeling and simulation.

Figure 2A:
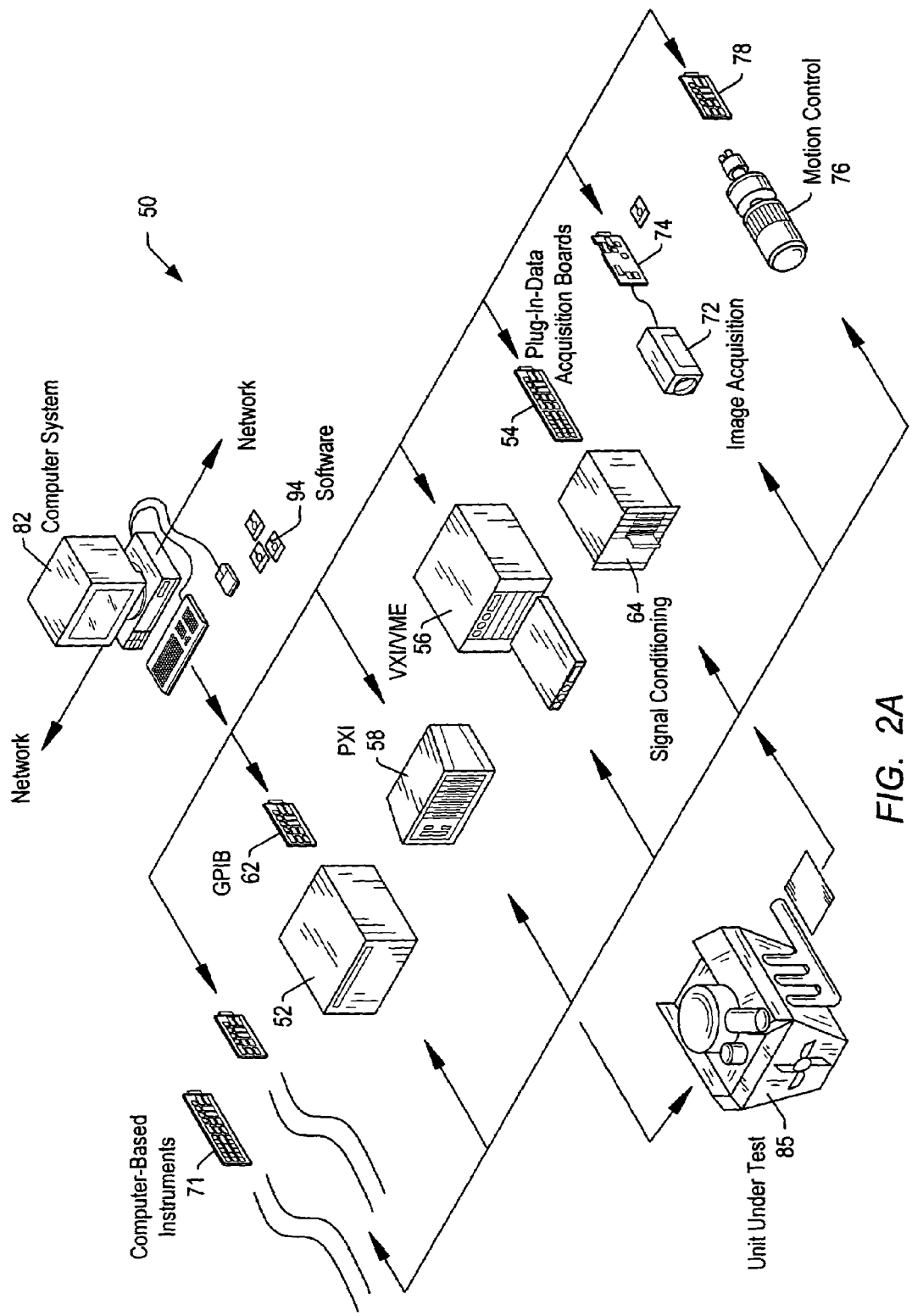
FIG. 2A illustrates an exemplary instrumentation control system which may implement embodiments of the invention.

FIG. 2A illustrates an exemplary instrumentation control system 50 which may implement embodiments of the invention. The system 50 comprises a host computer 82 which connects to one or more instruments. The host computer 82 may comprise a CPU, a display screen, memory, and one or more input devices such as a mouse or keyboard as shown, and the host computer 82 may be part of a network, such as a Local Area Network (LAN). The computer system 82 may operate with the one or more instruments to analyze, measure or control a UUT or process 85. The computer system 82 may also comprise a memory medium(s) on which one or more software programs and/or software components according to one embodiment of the present invention may be stored. The memory medium may also store operating system software, as well as other software for operation of the computer system. Various embodiments further include receiving or storing instructions and/or data implemented in accordance with the foregoing description upon a carrier medium.

The one or more instruments may include a GPIB (General Purpose Interface Bus) instrument 52 and associated GPIB interface card 62, a data acquisition board 54 and associated signal conditioning circuitry 64, a VXI instrument 56, a PXI instrument 58, a video device or camera 72 and associated image acquisition (or machine vision) card 74, a motion control device 76 and associated motion control interface card 78, and/or one or more computer based instrument cards 71, among other types of devices. The computer system may couple to and operate with one or more of these instruments. The instruments may be coupled to a unit under test (UUT) or process 85, or may be coupled to receive field signals, typically generated by transducers. The system 50 may be used in a data acquisition and control application, in a test and measurement application, an image processing or machine vision application, a process control application, a man-machine interface application, a simulation application, or a hardware-in-the-loop validation application, among others.

Figure 2B:
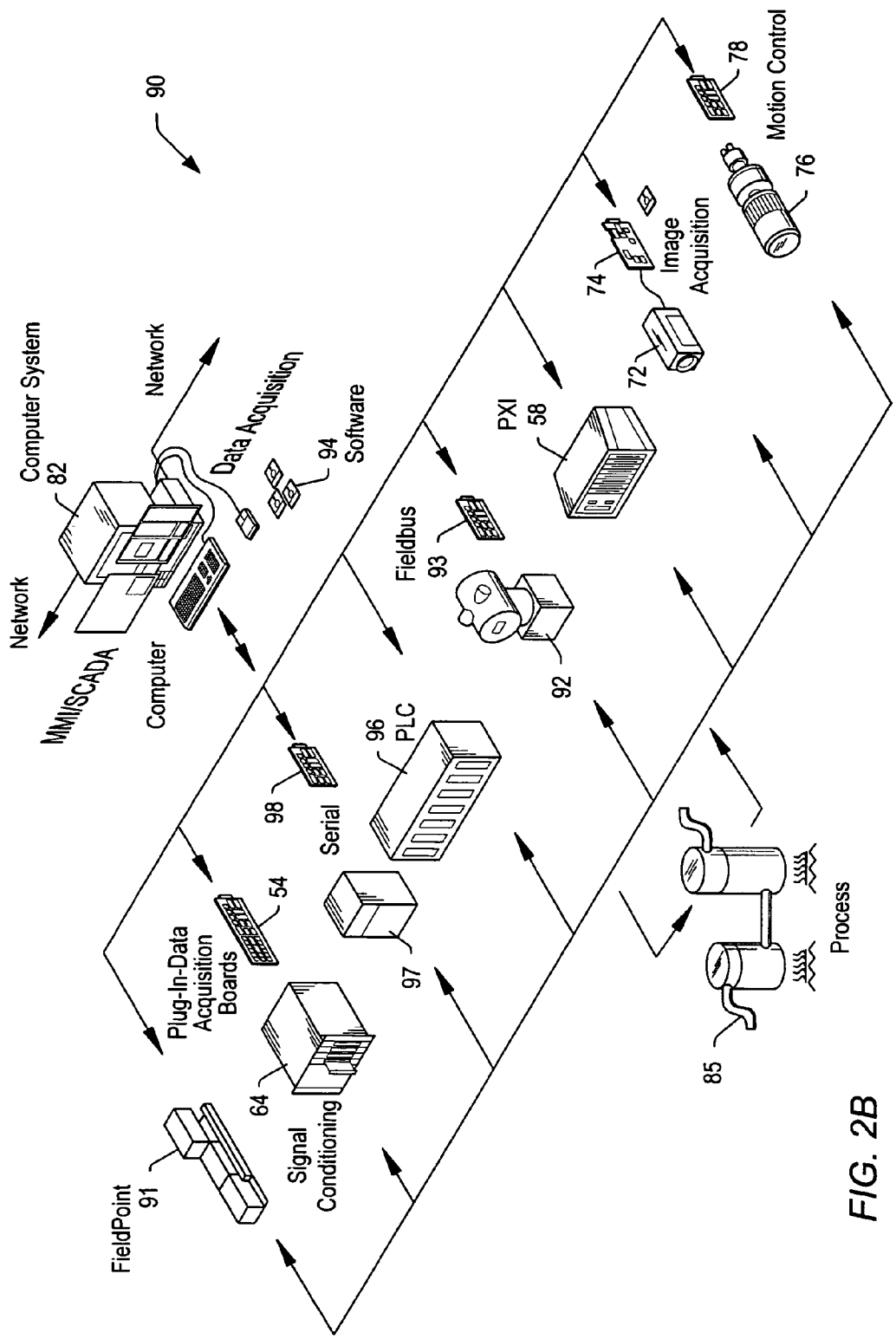
FIG. 2B illustrates an exemplary industrial automation system which may implement embodiments of the invention.

FIG. 2B illustrates an exemplary industrial automation system 90 which may implement embodiments of the invention. The industrial automation system 90 is similar to the instrumentation or test and measurement system 50 shown in FIG. 2A. Elements which are similar or identical to elements in FIG. 2A have the same reference numerals for convenience. The system 90 may comprise a computer 82 which connects to one or more devices (e.g., measurement devices) or instruments. The computer 82 may comprise a CPU, a display screen, memory, and one or more input devices such as a mouse or keyboard as shown. The computer 82 may operate with the one or more devices to a process or device 85 to perform an automation function, such as MMI (Man Machine Interface), SCADA (Supervisory Control and Data Acquisition), portable or distributed data acquisition, process control, advanced analysis, or other control, among others.

The one or more devices may include a data acquisition board 54 and associated signal conditioning circuitry 64, a PXI instrument 58, a video device 72 and associated image acquisition card 74, a motion control device 76 and associated motion control interface card 78, a fieldbus device 92 and associated fieldbus interface card 93, a PLC (Programmable Logic Controller) 96, a serial instrument 97 and associated serial interface card 98, or a distributed data acquisition system, such as the Fieldpoint system 91 available from National Instruments, among other types of devices.

Aligning Digital Marker Signals with Data Signals

Figure 3:
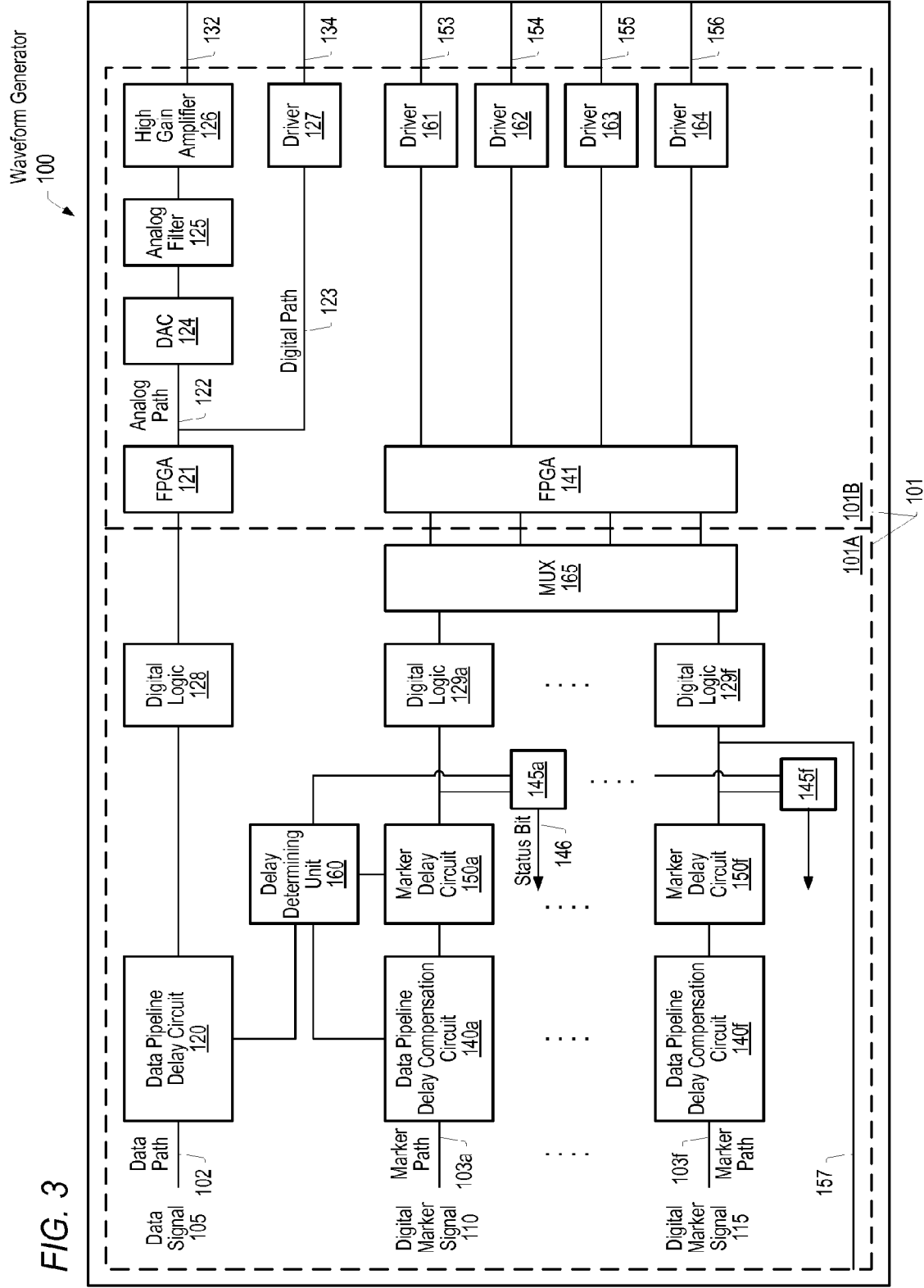
FIG. 3 illustrates a block diagram of one embodiment of a waveform generator comprising a circuit for delaying output of a first signal to output the first signal at a predetermined position with respect to output of a second signal.

Referring to FIG. 3, a block diagram of one embodiment of a waveform generator 100 (e.g., an arbitrary waveform generator) comprising a circuit 101 for delaying output of a first signal (e.g., a digital marker signal) to output the first signal at a predetermined position with respect to output of a second signal (e.g. analog signal) is shown. However, it is noted that an embodiment of circuit 101 may be included within any type of waveform generator. Additionally, it is noted that in other embodiments circuit 101 may be coupled to waveform generator 100, i.e., circuit 101 may be external to the waveform generator 100.

In one embodiment, circuit 101 may include separate travel paths for data signal 105 and digital marker signal 110. In one embodiment, each travel path may include various components that may introduce respective delays in the output of the data signal 105 and digital marker 110. Thus, depending upon the different components of the two paths, the intrinsic delays associated with the paths may differ.

As illustrated, data path 102 may be the travel path for the data signal 105. In one embodiment, data path 102 may comprise a data pipeline delay circuit 120 coupled to a delay determining unit 160 and digital logic 128. Additionally, digital logic 128 may be coupled to a field programmable gate array (FPGA) 121, which may be further coupled to an analog path 122 and a digital path 123. In one embodiment, analog path 122 may comprise a digital-to-analog converter (DAC) 124 coupled to an analog filter 125, which may also be coupled to a high-gain amplifier 126. In this embodiment, the data signal 105 may be output in analog form from analog path 122 via data path I/O terminal 132. In one embodiment, digital path 123 may comprise output driver 127, and the data signal 105 may be output in digital form from digital path 123 via data path I/O terminal 134. Thus, each of the signal paths may have a corresponding intrinsic delay based on the various components in the travel path. Note also, that each of the signal path may be modified, e.g., by configuring the path to route around one or more of the components, or routing through additional components, thus changing the corresponding delay accordingly.

Marker path 103a, in one embodiment, may be the travel path for the digital marker signal 110. In one embodiment, marker path 103a may comprise a data pipeline delay compensation circuit 140a coupled to a delay determining unit 160 and a marker delay circuit 150a. Also, marker delay circuit 150a may be coupled to a status notification delay circuit 145a, delay determining unit 160, and digital logic 129a, which may coupled to a multiplexer 165. Additionally, in this embodiment, multiplexer 165 may be coupled to FPGA 141, which may further be coupled to output drivers 161-164. In one embodiment, digital marker 110 may be output from marker path 103a via any one of marker path I/O terminals 153-156. Furthermore, in one embodiment, circuit 101 may comprise a plurality of marker paths, for example, circuit 101 may comprise marker paths 103a-103f (103b-103e being represented by the vertical dots in FIG. 3), which are similar to the illustrated marker path 103. In this example, as illustrated in FIG. 3, marker paths 103a-103f may include data pipeline delay compensation circuits 140a-140f (140b-140e being represented by the vertical dots in FIG.3), marker delay circuits 150a-150f (150b-150e being represented by the vertical dots in FIG. 3), digital logic circuits 129a-129f (129b-129e being represented by the vertical dots in FIG. 3), and status notification delay circuits 145b-145e (145b-145e being represented by the vertical dots in FIG.3). In one embodiment, the plurality of marker paths are operable to output a plurality of digital markers via a plurality of marker path I/O terminals.

For example, one or more of digital marker signals 110-115 may be output via marker path I/O terminals 153-156.

It should be noted that the signal travel paths and components described, for example with reference to FIG. 3, are meant to be exemplary only, and are not intended to limit the invention to any specific set of components or configurations. For example, in various embodiments, one or more of the components described may be omitted, combined, modified, or additional components included, as desired.

In one embodiment, circuit 101 may receive data signal 105 and digital marker signal 110 in response to a user input. For example, the user may specify generation of a sinusoidal signal by inputting a particular wavelength, amplitude, sampling rate, and/or interpolation rate. As another example, the user may specify a waveform by name, e.g., by entering or selecting a filename of a file wherein data specifying the waveform is stored. It is noted however that in other embodiments the data signal 105 and digital marker 110 may be created by other means, for example, by reproduction or modification of an existing signal. Also, in one embodiment, the user may specify generation of a digital marker associated with a particular sample point comprised in data signal 105. For example, in one embodiment, the user may specify a sample number to generate a digital marker associated with the particular sample point. Also, in one embodiment, the user may specify a position of the digital marker with respect to a waveform by specifying a particular time value corresponding to a position in the waveform.

As noted above, in one embodiment, delay determining unit 160 may be operable to determine a relative delay between the digital marker signal 110 and the data signal 105 based upon data path 102 and marker path 103. Furthermore, delay determining unit 160 may be operable to program marker delay circuit 150 to delay the output of the digital marker signal 110 from waveform generator 100 to output the digital marker signal 110 at a predetermined position with respect to the output of the data signal 105, based on the determined relative delay. More specifically, in one embodiment, delay determining unit 160 may be operable to automatically program marker delay circuit 150 to add the relative delay to the output of the digital marker 110 to automatically align the output of the digital marker 110 with respect to the output of the data signal 105. In one embodiment, the output of the digital marker 110 (e.g., via marker path I/O terminal 153) may be aligned with respect to the output of a specific waveform location or sample point comprised in data signal 105 (e.g., via data path I/O terminal 132). In a more general embodiment, either or both of the data signal 105 and the digital marker 110 may be delayed based on the respective path delays, and/or desired alignment criteria specified by the user.

In one embodiment, delay determining unit 160 may be implemented in software. In a further embodiment, delay determining unit 160 may be implemented in hardware. In yet another embodiment, delay determining unit 160 may be implemented in both hardware and software. It is noted that in one embodiment marker delay circuit 150 may be any type of programmable delay circuit that is operable to delay the output of digital marker 110.

Figure 4:
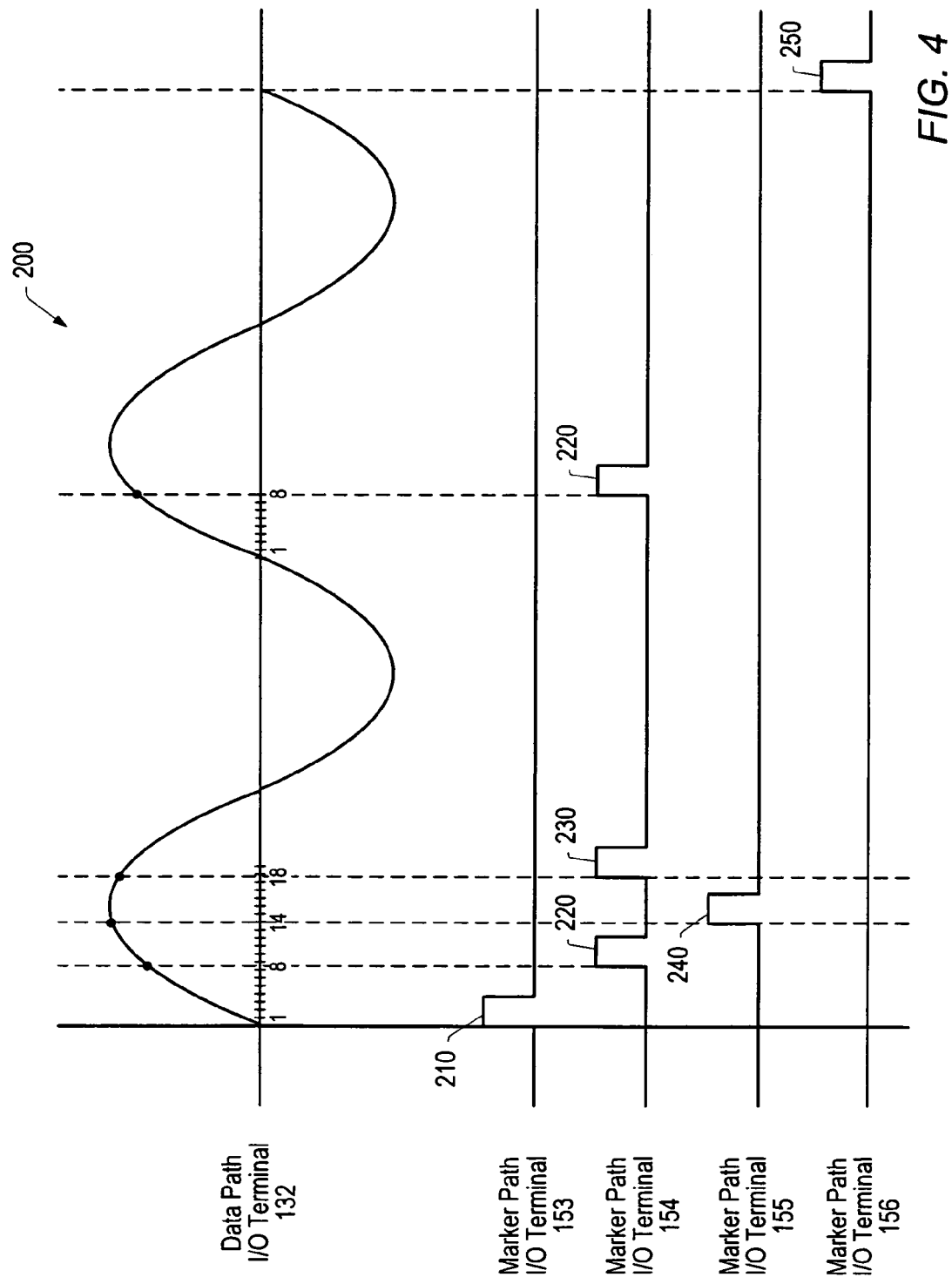
FIG. 4 illustrates one example of digital marker signals aligned in time with data signals, according to one embodiment.

FIG. 4 illustrates one example of digital marker signals aligned in time with data signals. Referring collectively to FIG. 3 and FIG. 4, in one embodiment, data signal 200, which in one embodiment may be in the form of an analog waveform (e.g., sinusoidal signal), may be output from data path I/O terminal 132 of waveform generator 100 and comprises a plurality of sample points. It is noted that in other embodiments the waveform may be any type of signal, such as a digital signal of multiple bits or lines including a plurality of pulses in a particular binary pattern.

In one embodiment, digital markers may be digital pulses that indicate particular events or specific waveform locations. As illustrated, in one embodiment, digital marker signals 210, 220, 230, 240, and 250 may be aligned with data signal 200 to indicate specific waveform locations with respect to data signal 200. More specifically, each of the digital markers may be output from waveform generator 100 to be aligned in time with a specific waveform location or sample point comprised in data signal 200. For example, in one embodiment, digital marker 220 may be output from marker path I/O terminal 154 to be aligned with the eighth sample point (sample number 8) of data signal 200, and digital marker 240 may be output from marker path I/O terminal 155 to be aligned with sample number 14 of data signal 200. Although in the example of FIG. 4, the marker positions are specified by sample numbers, i.e., in the sample domain, in other embodiments, the marker positions may be specified in the time domain. For example, a marker may be specified to occur at 50 ns, i.e., 50 ns after initiation of the data signal.

In one embodiment, an "event" may be a particular sample point at a particular point in time comprised in data signal 200, which may have a particular significance. For example, digital marker signal 210 may be output from marker path I/O terminal 153 to be aligned in time with respect to the output of the first sample point (sample number 0) of data signal 200. In this example, sample number 0 is an event that may be significant because it indicates the starting point of the waveform corresponding to data signal 200. In another example, digital marker 250 may be output from marker path I/O terminal 156 to be aligned in time with respect to the output of the last sample point, which may be significant because it indicates the end of the waveform corresponding to data signal 200. In one embodiment, the first sample point may be identified as the "Started Event" and the last sample point may be identified as the "Done Event" because of the importance of these particular sample points. Furthermore, in one embodiment, other sample points associated with data signal 200 may be important to a particular user; therefore, the user may generate additional digital markers to be aligned in time with the additional sample points. For example, as illustrated in FIG. 4, digital marker 230 may be output to be aligned with sample point 18 and digital marker 240 may be output to be aligned with sample point 14.

A marker path I/O terminal, in one embodiment, may output a marker signal comprising one or more digital markers. For example, marker path I/O terminal 154 may output a marker signal comprising digital markers 220 and 230, and marker path 155 may output a marker signal comprising digital marker 240. In addition, in one embodiment, a marker path I/O terminal may output a digital marker that is pulsed at a particular sample point during each cycle of the associated waveform. For example, as illustrated in FIG. 4, in one embodiment, marker path I/O terminal 154 may output digital marker 220 which may be aligned in time with the output of sample number 8 during each cycle of the waveform corresponding to data signal 200. In this example, digital marker 220 may be pulsed once during the first cycle and a second time during the second cycle of the waveform. It is noted however that in other embodiments the waveform corresponding to data signal 200 may comprise any number of cycles and digital marker 220 may be pulsed any number of times. Furthermore, in one embodiment, marker path I/O terminal 154 may output digital marker 230, which is pulsed at a particular sample point (e.g., sample number 18) during one of the plurality of cycles of the waveform corresponding to data signal 200.

Figure 5:
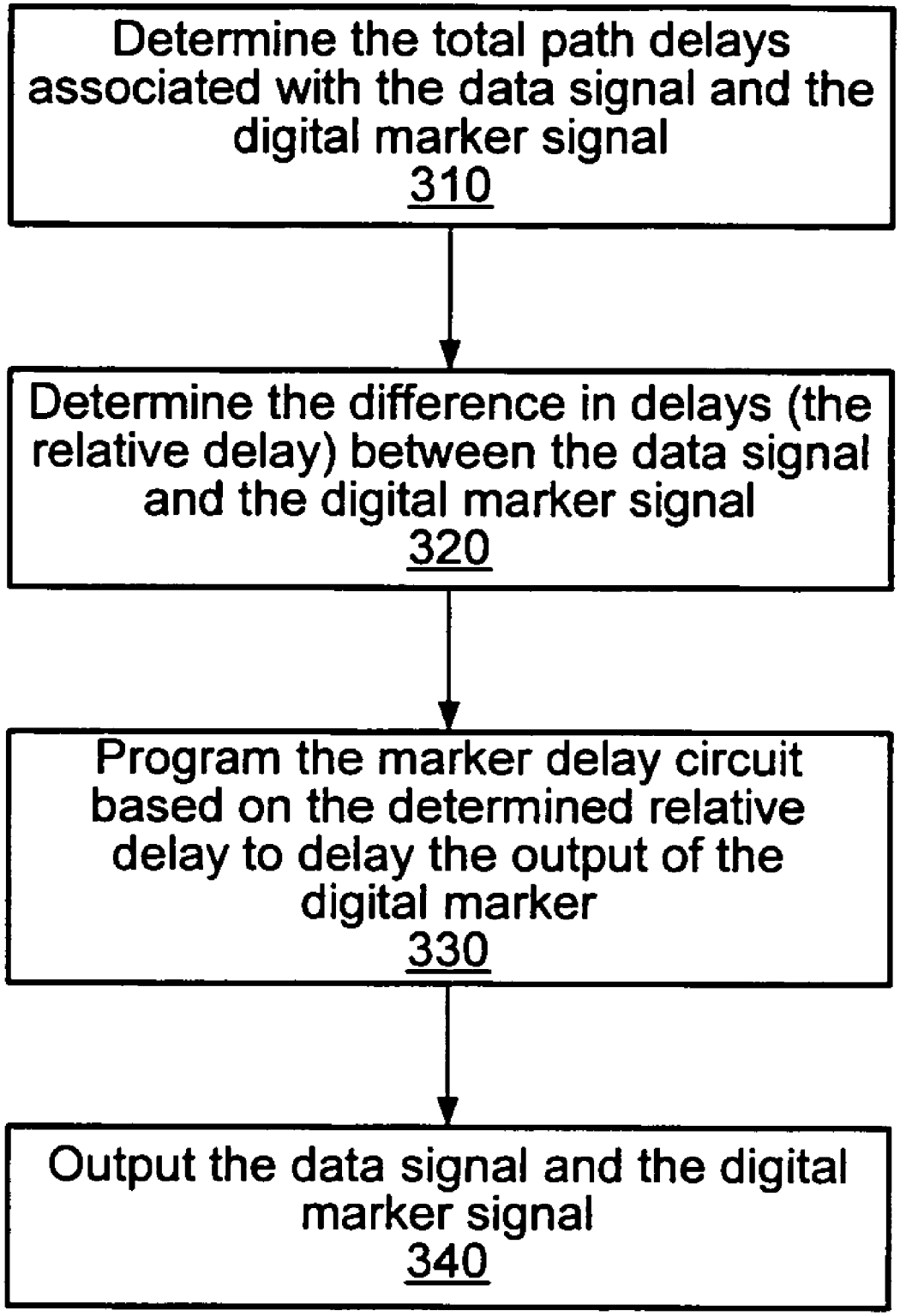
FIG. 5 is a flow diagram illustrating a method for aligning data signals and digital marker signals, according to one embodiment.

FIG. 5 is a flow diagram illustrating a method for aligning data signal 105 and digital marker signal 110. It should be noted that in various embodiments, some of the steps shown may be performed concurrently, in a different order than shown, or omitted. Additional steps may also be performed as desired.

Referring collectively to FIG. 3 and FIG. 5, as indicated in 310, in one embodiment, to automatically determine a relative delay between digital marker signal 110 and the data signal 105, delay determining unit 160 may automatically determine a total path delay associated with data path 102 of the data signal 105 and a total path delay associated with marker path 103 of the digital marker 110.

In 320, the delay determining unit 160 may automatically determine the relative delay by calculating the difference between the determined total path delay associated with the data signal 105 and the determined total path delay associated with the digital marker signal 110, according to one embodiment.

Furthermore, in one embodiment, delay determining unit 160 may automatically program marker delay circuit 150 based on the determined relative delay to delay the output of the digital marker 110 to automatically align the output of the digital marker 110 in time or sample number with respect to the output of the data signal 105, as indicated in 330. As described below in more detail, in some embodiments, further delay criteria may be considered in the determination of the delay to be programmed, including, for example, user specified offsets or placement of the marker(s) with respect to the data signal.

Lastly, in one embodiment, waveform generator 100 may output the data signal 105 and the digital marker 110, where the output of the digital marker 110 is preferably aligned in time or sample number with respect to the output of the data signal 105, as indicated in 340, in accordance with the determined relative delay. For example, in one embodiment, the output of the data signal 105 from data path I/O terminal 132 may be aligned with the output of the digital marker signal 110 from marker path I/O terminal 153.

In one embodiment, both data path 102 and marker path 103 may include fixed path delays, which may be relatively constant regardless of the data path 102, and may also include variable path delays, which may vary depending on the data path 102. It is noted however that in other embodiments the data path 102 and/or the marker path 103 may include only fixed path delays or only variable path delays. In one embodiment, the total path delay associated with the data signal 105 may be determined by using the fixed path delay and the variable path delay of data path 102. For example, in one embodiment, the total path delay associated with the data signal 105 may be the sum of the fixed path delay and the variable path delay of data path 102. In one embodiment, the determined total path delay associated with the data signal 105 may be greater than the determined total path delay associated with the digital marker 110. It is noted however that in other embodiments the determined total path delay associated with the data signal 105 may be less than or equal to the determined total path delay associated with the digital marker 110.

Figure 6:
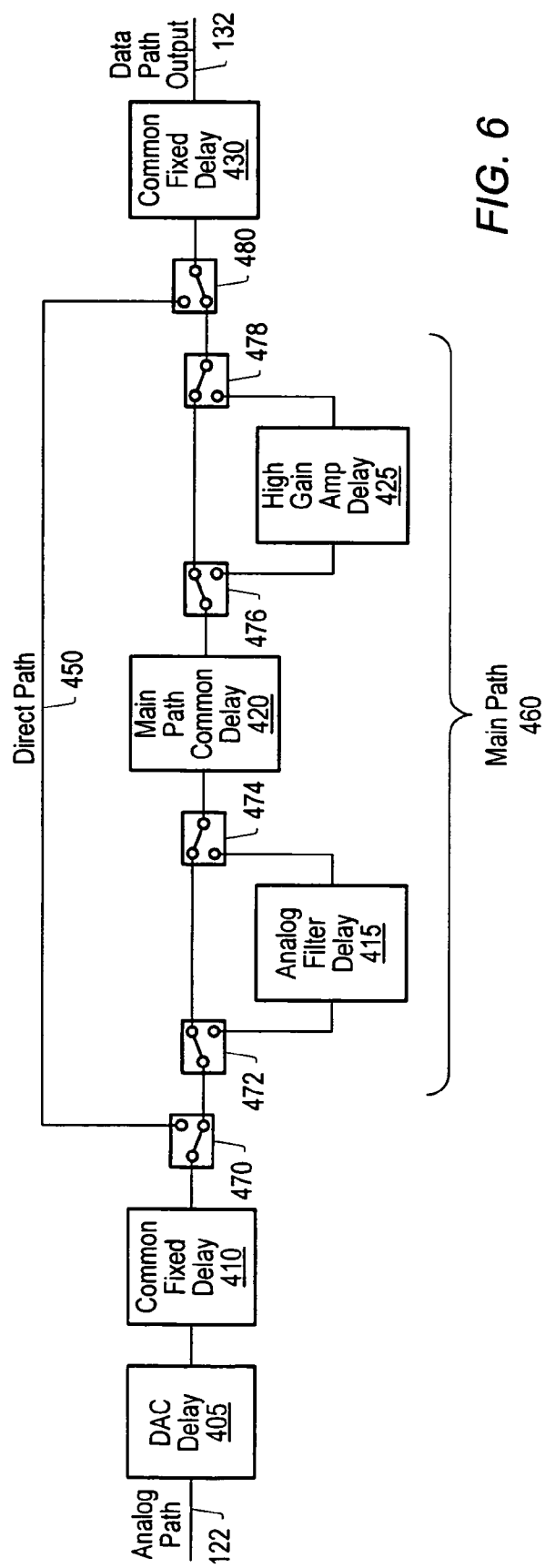
FIG. 6 illustrates a block diagram of one embodiment of an analog path including fixed delay elements and variable delay elements.

FIG. 6 illustrates a block diagram of one embodiment of an analog path 122 including fixed delay elements and variable delay elements. Referring collectively to FIG. 3 and FIG. 6, analog path 122, in one embodiment, may be part of data path 102 and may be operable to output data signal 105 in analog form. Analog path 122 may introduce a fixed path delay and a variable path delay to the output of data signal 105, which may be detected and used to determine the total path delay associated with the data signal 105. In one embodiment, analog path 122 comprises a plurality of delay elements that introduce various delays to the output of data signal 105, such as a digital-to-analog converter (DAC) delay 405, a common fixed delay 410, an analog filter delay 415, a main path common delay 420, a high-gain amplifier delay 425, and a common fixed delay 430. However, it is noted that these path delay elements are intended to be exemplary only, and are not intended to limit the constituent elements of the path to any particular set or arrangement of elements.

In one embodiment, delay determining unit 160 may determine the fixed path delays, which may be relatively constant regardless of the travel path, and the variable path delay, which may vary depending on the travel path. In one embodiment, analog path 122 may include a direct path 450 and a main path 460. In one embodiment, user inputs with respect to the waveform generator 100 may determine what path the data signal 105 may be sent through. Based on the user inputs, in one embodiment, delay determining unit 160 may control the state of the switches 470, 472, 474, 476, 478, and 480, which determine the travel path of the data signal 105. For example, a user may select the analog filter setting and may specify the interpolation rate for the DAC 124 in the waveform generator 100. In one embodiment, in response to the user input delay determining unit 160 may control the state of the switches 470 and 480 to open the main path 460. Additionally, in one embodiment, in response to the user input, delay determining unit 160 may control the state of switches 472 and 474 to open the path to analog filter 125 and may control the state of switches 476 and 478 to close the path to the amplifier 126. As a result, in this example, the fixed delay associated with the analog path 122 may include the sum of the common fixed delay 410 and the common fixed delay 430. Furthermore, in this example, the variable delay associated with the analog path 122 may include the sum of the DAC delay 405, the main path common delay 420, and the analog filter delay 415.

In one embodiment, the user inputs specifying the travel path of the data signal and/or the one or more operations to be performed on the data signal may be received via a graphical user interface (GUI). It is noted however that in other embodiments the user inputs may be received by other methods, for example, by the user pressing buttons on the waveform generator 100 or by other mechanical means, or, alternatively, the inputs may be retrieved from a file or received from an external device, e.g., over a network.

In another example, a user input may specify only the interpolation rate for DAC 124 or may select a default setting for the interpolation rate. In this example, in response to the user input, in one embodiment, the data signal 105 may be sent through the direct path 450, bypassing the analog filter and the high-gain amplifier. In one embodiment, the user input may specify the direct path 450. It is noted that, in one embodiment, if the data signal 105 is sent through the direct path 450, the delay associated with the analog path 122 may be less than if the data signal 105 is sent through the main path 460. It is further noted, however, that in other embodiments, other delay elements may be included within the analog path 122 and, more specifically, other delay elements may be included in the main path 460 and one or more delay elements may be included in the direct path 450, thereby affecting their respective delays.

As noted above, each element in a path may contribute a respective delay to the overall delay for the path. For example, in one embodiment, the DAC delay 405 may vary between 6.5 and 28.5 sample clock periods (which corresponds to 65 to 285 nanoseconds at a sample rate of 100 MS/s) depending on the selected interpolation rate of DAC 124, the sum of the common fixed delay 410 and 430 may be approximately 3.64 ns, the analog filter delay 415 may be approximately 7.8 ns, the main path common delay 420 may be approximately 10 ns, and the high-gain amplifier delay 425 may be approximately 3 ns. It is noted however that in other embodiments the delays associated with the above delay elements may vary.

To determine the total path delay of the data path 102 associated with data signal 105, which may be needed to calculate the relative delay between the output of the data signal 105 and the digital marker 110, in one embodiment, other sources of delay may be considered besides the delay elements of analog path 122. For example, in one embodiment, delay determining unit 160 may also detect the additional fixed delay associated with the rest of data path 102, such as the fixed delay associated with FFGA 121 and the fixed delay associated with digital logic 128.

In one embodiment, delay determining unit 160 may also account for delay differences due to different sample rates associated with the data signal 105. In one embodiment, one or more delay elements may introduce a delay that is a number of sample clocks in length, which when translated into the time domain may be a varying delay that is dependent upon the sample rate. However, in one embodiment, one or more delay elements may introduce a delay that is invariant with respect to the sample rate at which the waveform generator generates the samples associated with data signal 105.

Additionally, in one embodiment, to calculate the relative delay between the output of the data signal 105 and the digital marker 110, delay determining unit 160 may determine the total path delay of marker path 103, which may correspond to the delay associated with the output of the digital marker 110. In one embodiment, the total path delay of marker path 103 may include a marker path I/O terminal delay. In one embodiment, the marker path I/O terminal delay may be the delay associated with one of the marker path I/O terminals 153-156. In this embodiment, the marker path I/O terminal delay may be a variable delay since each of the marker path I/O terminals 153-156 may include different delay elements. In one embodiment, marker path I/O terminals 153-156 may include similar delay elements, such as the drivers 161-164; however, in one embodiment, the drivers 161-164 may each introduce a different delay to the output of the digital marker 110. It is noted however that in other embodiments the marker path I/O terminal delay may be a fixed delay, which may be consistent across the plurality of marker path I/O terminals. Furthermore, in one embodiment, the total path delay of marker path 103 may further include a delay associated with FFGA 141, a delay associated with MUX 165, and/or delays associated with digital logic 129.

Figure 7:
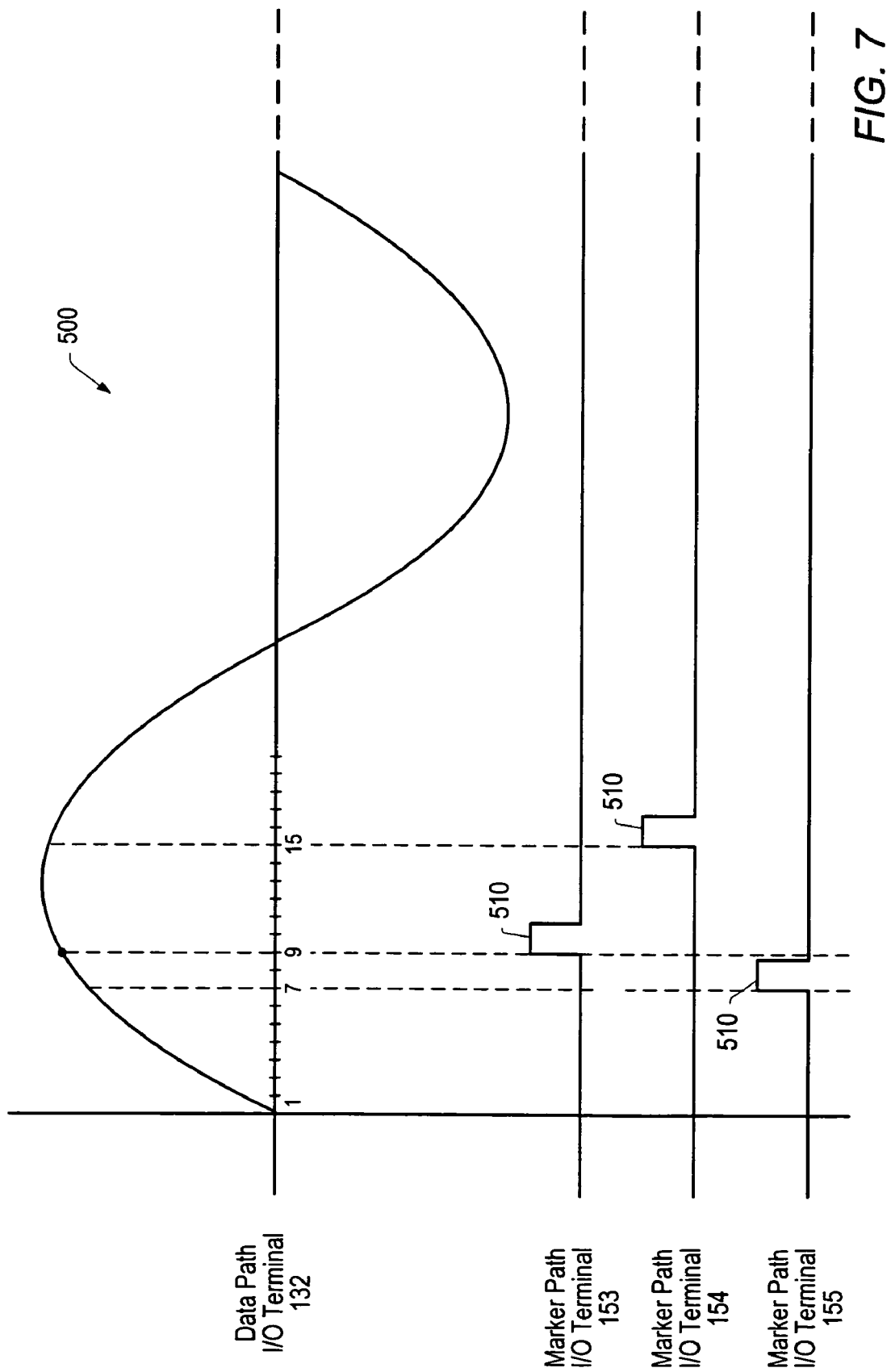
FIG. 7 illustrates one example of delaying the output of digital markers to output the digital markers at a predetermined position in time with respect to the output of a data signal, according to one embodiment.

FIG. 7 illustrates one example of delaying the output of digital markers to output the digital markers at a predetermined position in time with respect to the output of a data signal. Referring collectively to FIG. 3 and FIG. 7, in one embodiment, data signal 500, which may be in the form of an analog waveform, may be output from data path I/O terminal 132 of waveform generator 100 and may comprise a plurality of sample points. It is noted that in other embodiments the waveform may be any type of signal, such as a digital signal including a binary pattern.

In one embodiment, delay determining unit 160 may be operable to automatically program the marker delay circuit 150 to add the determined relative delay to the output of the digital marker to align the output of the digital marker 510 with the output of the data signal 500. For example, as illustrated, digital marker 510 may be output from marker path I/O terminal 153 to align with the ninth sample point (i.e., sample number 9) of the waveform corresponding to the data signal 500. Additionally, in one embodiment, delay determining unit 160 may be operable to receive a user input indicating an additional delay to program the marker delay circuit 150 to add the determined relative delay plus the additional delay to the output of the digital marker 510 to output the digital marker 510 at a predetermined position in time with respect to the output of the data signal 500. For example, the user input may indicate to add an additional delay of 6 samples to the output of the digital marker 510. In this example, as illustrated, digital marker 510, which may be output from marker path I/O terminal 154, may be output at a position corresponding to the output of sample number 15. It is noted that in other embodiments a user may specify the additional delay in the waveform generator 100 by entering a delay value in terms of time or number of samples.

Furthermore, in one embodiment, delay determining unit 160 may be operable to receive a user input reducing the determined relative delay to program the marker delay circuit 150 to add the reduced relative delay value to the output of the digital marker 510 to output the digital marker 510 at a predetermined position in time with respect to the output of the data signal 500. For example, the user input may indicate to reduce the determined relative delay by 2 samples. In this example, as illustrated, digital marker 510, which may be output from marker path I/O terminal 155, may be output at a position corresponding to the output of sample number 7. It is noted that in this embodiment the marker 510 may be output before the output of the corresponding sample point.

In one embodiment, a user of waveform generator 100 may temporarily disable the automatic delay determining capabilities of delay determining unit 160. Instead, in this embodiment, the user may determine the relative delay between the digital marker 510 and the data signal 500 based upon a travel path of the digital marker 510 and a travel path of the data signal 500. The user, in this embodiment, may program the marker delay circuit 150 to delay output of the digital marker 510 to position the digital marker 510 with respect to the data signal 500, based on the determined relative delay. More specifically, in one embodiment, delay determining unit 160 may be operable to receive the user input specifying a desired delay value, which may be based on the determined relative delay. In response to the user input, in one embodiment, delay determining unit 160 may program the marker delay circuit 150 to add the desired delay to the output of the digital marker 510 to output the digital marker 510 at a predetermined position in time with respect to the output of the data signal 500. For example, the user may determine that the relative delay between the output of digital marker 510 and the output of data signal 500 may be 5 samples; however, the user may add an additional delay of 6 samples to the output of digital marker 510 or a total desired delay of 11 samples. It is noted however that in other embodiments the user may not determine the relative delay between the digital marker 510 and the data signal 500. Therefore, it is also noted that in other embodiments the user may program the marker delay circuit 150 to add any delay to the output of the digital marker 510.

Referring back to FIG. 3, in one embodiment, circuit 101 may be comprised in a single module. In another embodiment, circuit 101 may be formed by coupling a first module 101A to a second module 101B, shown demarcated in FIG. 3 by phantom line 180. In one embodiment, the first module 101A may be a base module, which may provide a common platform for delaying data signal and digital markers. In one embodiment, the second module 101B may be a daughter module, which may be, in one embodiment, an analog output module or, in another embodiment, a digital output module. In one embodiment, the delay determining unit 160 may determine the delay associated with the travel path of a particular type of daughter module to determine the relative delay, as described above. In one embodiment, the delay determining unit 160 may determine the delay associated with the travel path of a particular daughter module/base module combination to determine the relative delay, as described above. In one embodiment, as shown in FIG. 3, the base module may include at least one additional marker path I/O terminal 157 to output one or more digital markers (e.g., digital markers 110-115, with markers 111-114 being represented by the vertical dots) to be positioned with respect to data signal 105.

In one embodiment, a first circuit 101 which may be included in waveform generator 100, may include different delay elements than a second circuit 101 that may be included in another waveform generator. In another embodiment, the first circuit 101 may include the same delay elements than the second circuit 101; however, in one embodiment, identical delay elements may still introduce different delays in the first circuit 101 when compared to the second circuit 101. In one embodiment, each of a plurality of base modules and each of a plurality of daughter modules may similarly introduce different delays in different circuits 101.

In one embodiment, each of the plurality of modules described above may be individually calibrated to determine the delays associated with the travel paths of each of the particular modules. In this embodiment, delay determining unit 160 may detect, measure, or retrieve the specific delay values associated with the travel paths of a particular module to more accurately calculate the relative delay between the data signal 105 and the digital marker signal 110.

As illustrated in FIG. 3, in one embodiment, the data path 102 comprises both the analog path 122 and the digital path 123. In one embodiment, the data signal 105 may be sent through digital path 123 and may be output via data path I/O terminal 134 in digital form. In one embodiment, which may be similar to the embodiments described above, delay determining unit 160 may determine a relative delay between the data signal 105, which may be output from data path I/O terminal 134, and digital marker 110, which may be output from marker path I/O terminal 153. In one embodiment, delay determining unit 160 may program the marker delay circuit 150 to delay the output of digital marker 110 to align the output of digital marker 110 in time with respect to the output of the data signal 105. It is noted that, in one embodiment, the embodiments described above with respect to the output of the data signal 105 via analog path 122 may similarly apply to the output of data signal 105 via digital path 123.

In one embodiment, delay determining unit 160 may determine a delay difference between the analog path 122 and the digital path 123 associated with data path 102. In one embodiment, delay determining unit 160 may program a delay circuit (not shown) to delay the output of the data signal from the digital path 123 to align the output of the data signal from digital path 123 in time with respect to the output of the data signal from analog path 122. It is noted however that in other embodiments delay determining unit 160 may program a delay circuit (not shown) to output the data signal from digital path 123 at any position in time with respect to the output of the data signal from analog path 122.

In further embodiments, the relative delay may be determined by a first component, e.g., the delay determining unit 160, and the delay circuit, e.g., marker delay circuit 150, may be programmed by a second component, e.g., a delay programming circuit (not shown). In other words, the functionality described above with regard to the delay determining unit 160 may be distributed across multiple components. In various embodiments, this type of functional distribution may also apply to other components described herein.

In one embodiment, as shown in FIG. 3, circuit 101 may comprise a status notification delay circuit 145. In one embodiment, delay determining unit 160 may program status notification delay circuit 145 to delay the assertion of a status notification bit. In one embodiment, each of a plurality of status notification bits may be associated with each of a plurality of digital markers that may be output from waveform generator 100. In one embodiment, a status notification bit 146 associated with the digital marker 110 may be asserted to notify a user or a system about the digital marker 110. For example, in one embodiment, the assertion of status notification bit 146 may indicate that digital marker 110 has been output. In one embodiment, digital marker 110 may be associated with the last sample point of data signal 105 (e.g., a "Done Event"), and therefore the assertion of the status notification bit 146 may indicate that data signal 105 has been output. In this example, in one embodiment, in response to the assertion of status notification bit 146, indicating that data signal 105 has been output, waveform generator 100 may turn off data path I/O terminal 132.

It is noted that if the status notification bit 146 is not delayed to account for the delays associated with the data path 102, then data path I/O terminal 132 may be turned off early, e.g., before the data signal 105 is output. Therefore, in one embodiment, delaying the status notification bit 146 may align the status notification with the actual event associated with the data signal 105. It is noted that in other embodiments delay determining unit 160 may be operable to receive user inputs specifying a particular delay value and may be operable to program status notification delay circuit 145 to delay the assertion of a status notification bit based on the specified delay value.

Variations in temperature may affect the delays associated with circuit 101. Thus, in one embodiment, circuit 101 may comprise a temperature sensing circuit (not shown). In one embodiment, the temperature sensing circuit may be configured to sense a temperature associated with the circuit 101, e.g., to adjust the determined relative delay based on the sensed temperature. In one embodiment, delay determining unit 160 may adjust the determined relative delay based on the sensed temperature to program the marker delay circuit 150 with the appropriate relative delay. In one embodiment, the temperature sensor circuit may compare the sensed temperature of a particular circuit component, such as the high-gain amplifier 126, with the previous detected temperature of that component to determine a temperature difference. In this embodiment, delay determining unit 160 may use the determined temperature differences of one or more circuit components to determine the relative delay.

Aligning Signals From Multiple Waveform Generators

Referring back to FIG. 1B, the second signal 12 provided by waveform generator 10 may be aligned in time with respect to the third signal 32 provided by waveform generator 30 to test a particular device (e.g., a UUT 35). In one embodiment, each of waveform generators 10 and 30 may be a standalone waveform generator or a computer-based waveform generator. In one embodiment, each of waveform generators 10 and 30 may be an arbitrary waveform generators or a digital waveform generator (i.e., logic signal source). Furthermore, in one embodiment, each of waveform generators 10 and 30 may comprise one embodiment of circuit 101 as illustrated in the embodiments of FIG. 3 and FIG. 6 and may comprise the functionality of circuit 101 as described in the above embodiments with reference to FIG. 3-7.

In one embodiment, waveform generator 10 may be coupled to waveform generator 30. Waveform generators 10 and 30, in one embodiment, may be configured to receive user inputs specifying generation of signals. It is noted however that in other embodiments the signals may be created by other means, for example, by reproduction or modification of existing signals. In one embodiment, a delay determining unit, comprised in the system of FIG. 1B, may be operable to determine a relative delay between the second signal 12 (e.g., an analog signal) provided by the waveform generator 10 and the third signal 32 (e.g., an analog signal) provided by the waveform generator 30, based upon a travel path of the second signal 12 and a travel path of the third signal 32. Additionally, in one embodiment, the delay determining unit may be operable to program a data pipeline delay circuit, comprised in one of the waveform generators 10 and 30, based on the determined relative delay, to delay the output of one of the first and second signals to align the output of the second signal 12 with the output of the third signal 32.

Figure 8:
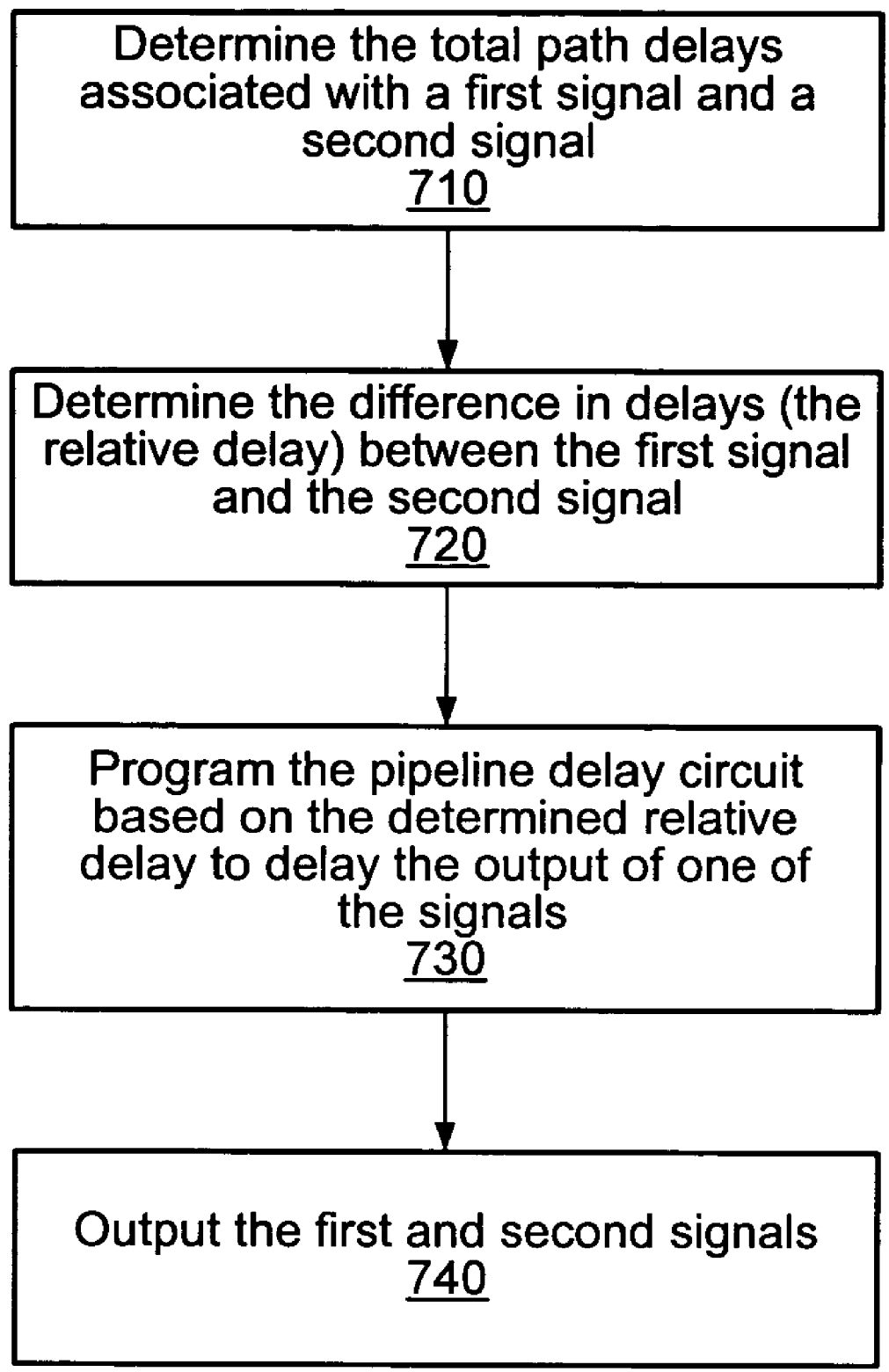
FIG. 8 is a flow diagram illustrating a method for aligning a first signal provided by a first waveform generator and a second signal provided by a second waveform generator, according to one embodiment.

FIG. 8 is a flow diagram illustrating a method for aligning the second signal 12 provided by waveform generator 10 and the third signal 32 provided by waveform generator 30. It should be noted that in various embodiments, some of the steps shown may be performed concurrently, in a different order than shown, or omitted. Additional steps may also be performed as desired.

Referring collectively to FIG. 1B, FIG. 3, and FIG. 8, as indicated in 710, in one embodiment, a delay determining unit may automatically determine a total path delay associated with a travel path of the second signal 12 (e.g., an analog signal) and a total path delay associated with a travel path of the third signal 32 (e.g., an analog signal).

In one embodiment, as indicated in 720, the delay determining unit may also automatically determine a relative delay between the second signal 12 and the third signal 32 by calculating the difference between the determined total path delay associated with the second signal 12 and the determined total path delay associated with the third signal 32.

In 730, the delay determining unit may also automatically program a data pipeline delay circuit, such as data pipeline delay circuit 120 comprised in waveform generator 100 (as shown in FIG. 3), based on the determined relative delay, to delay the output of one of the signals 12 and 32 to align the output of the second signal 12 with the output of the third signal 32, according to one embodiment. As described below in more detail, in some embodiments, further delay criteria may be considered in the determination of the delay to be programmed, including, for example, user specified offsets.

Lastly, in one embodiment, waveform generator 10 and waveform generator 30 may output the signals 12 and 32, respectively, as indicated in 740, where the output of the second signal 12 is preferably aligned in time or sample number with respect to the output of the third signal 32, in accordance with the determined relative delay. In one embodiment, the output of the second signal 12 is from a first data path I/O terminal comprised in waveform generator 10 and the output of the third signal 32 is from a second data path I/O terminal comprised in waveform generator 30. It is noted however that in other embodiments the delay determining unit may be operable to program a first data pipeline delay circuit comprised in waveform generator 10 and a second data pipeline delay circuit comprised in waveform generator 30 to align the output of the second signal 12 with the output of the third signal 32.

In one embodiment, delay determining unit may be operable to receive a user input indicating an additional delay to program the data pipeline delay circuit to add the determined relative delay plus the additional delay to the output of the second signal 12 to output the second signal 12 at a predetermined position with respect to the output of the third signal 32. For example, the user input may indicate to add an additional delay of 6 samples to the output of the second signal 12. It is noted that in other embodiments a user may specify the additional delay in the waveform generators by entering a delay value in terms of time or number of samples.

In one embodiment, delay determining unit may be operable to receive a user input reducing the determined relative delay to program the data pipeline delay circuit to add the reduced relative delay to the output of the second signal 12 to output the second signal 12 at a predetermined position with respect to the output of the third signal 32. For example, the user input may indicate to reduce the determined delay by 2 samples.

In one embodiment, a user of waveform generator 10 may temporarily disable the automatic delay determining capabilities of delay determining unit. Instead, in this embodiment, the user may program the corresponding data pipeline delay circuit with a desired delay value to delay output of the second signal 12 to output the second signal 12 at a predetermined position with respect to the output of the third signal 32. In one embodiment, delay determining unit may be operable to receive a user input to program the corresponding data pipeline delay circuit with the desired delay value.

The delay determining unit, in one embodiment, may be operable to detect user input specifying the travel path of at least one of the signals 12 and 32 and/or one or more operations to be performed on the at least one of the signals 12 and 32 to determine a variable path delay associated with the travel path of the at least one of the signals 12 and 32. Additionally, in one embodiment, the delay determining unit may be operable to determine a fixed path delay associated with the travel path of the at least one of the signals 12 and 32. Furthermore, in one embodiment, the delay determining unit may be operable to calculate the total path delay associated with the at least one of the signals 12 and 32 using the determined fixed path delay and the determined variable path delay. In one embodiment, the total path delay associated with the remaining other of the signals 12 and 32 may be determined similarly to the total path delay associated with the at least one of the signals 12 and 32. Also, in one embodiment, the variable delays and fixed delays associated with the at least one of the signals 12 and 32 may be determined similarly as in the embodiments described above with reference to FIG. 6. However, in other embodiments, only fixed delays or only variable delays may be associated with either signal 12 or signal 32. It is noted however that the total path delay associated with the at least one of the signals 12 and 32 may be determined by other methods.

In one embodiment, each of the waveform generators 10 and 30 may comprise a delay determining unit. In one embodiment, the delay determining units may serve as a check to verify an accurate relative delay may be calculated. In one embodiment, each of signals 12 and 32 may be analog data signals or digital data signals. Also, in one embodiment, the data pipeline delay circuit may be any type of programmable delay circuit that may be operable to delay the output of at least one of a plurality of signals, for example, one of the signals 12 and 32.

In one embodiment, each of the waveform generators 10 and 30 may include a data pipeline delay circuit. For example, in one embodiment, waveform generator 10 may comprise data pipeline delay circuit 120 (as shown in FIG. 3) and waveform generator 30 may comprise another data pipeline delay circuit. In one embodiment, each of the waveform generators may comprise a plurality of data pipeline delay circuits. In this embodiment, each of the data pipeline delay circuits may be operable to delay the signals output by the respective waveform generator.

In one embodiment, each of the waveform generators 10 and 30 may also include a plurality of data pipeline delay compensation circuits, similar to the embodiment of FIG. 3. For example, similarly to FIG. 3, in one embodiment, waveform generator 10 may include data pipeline delay compensation circuit 140 and data pipeline delay compensation circuits 140*a*-140*f*. In one embodiment, each of the plurality of data pipeline delay compensation circuits in a particular waveform generator may be operable to delay one or more of a plurality of digital markers that may be output from the particular waveform generator. In one embodiment, the delay determining unit may be operable to program a data pipeline delay compensation circuit to delay the output of a digital marker signal which corresponds to a delayed data signal. In one embodiment, the delay data signal may be delayed by data pipeline delay circuit 120 to align the output of the delayed data signal with the output of another data signal; therefore, in response to the delay of the output of the delayed data signal, a data pipeline delay compensation circuit (e.g., data pipeline delay compensation circuit 140) may be programmed to compensate for the delay difference between the delayed data signal and the corresponding digital marker by delaying the output of the corresponding digital marker to align the output of the delayed data signal with the output of the corresponding digital marker.

What is claimed is:

1. A method for delaying output of a digital marker signal with respect to output of a data signal in an arbitrary waveform generator, the method comprising:
    determining a relative delay between the digital marker signal and the data signal based upon a travel path of the digital marker signal and a travel path of the data signals, wherein the data signal is a waveform output by the arbitrary waveform generator and wherein the digital marker signal indicates a predetermined position in the waveform; and
    programming a marker delay circuit to delay the output of the digital marker signal to output the digital marker signal at the predetermined position with respect to the output of the data signal, based on the determined relative delay.

2. The method of claim 1, wherein said programming a marker delay circuit to delay the output of the digital marker signal to output the digital marker signal at a predetermined position with respect to the output of the data signal, based on the determined relative delay, comprises automatically programming the marker delay circuit to add the relative delay to the output of the digital marker signal to automatically align the output of the digital marker signal in time with respect to the output of the data signal.

3. The method of claim 1, wherein said programming a marker delay circuit to delay the output of the digital marker signal to output the digital marker signal at a predetermined position with respect to the output of the data signal, based on the determined relative delay, comprises receiving a user input indicating an additional delay to program the marker delay circuit to add the determined relative delay plus the additional delay to the output of the digital marker signal to output the digital marker signal at the predetermined position in time with respect to the output of the data signal.

4. The method of claim 1, wherein said programming a marker delay circuit to delay the output of the digital marker signal to output the digital marker signal at a predetermined position with respect to the output of the data signal, based on the determined relative delay, comprises receiving a user input reducing the determined relative delay to program the marker delay circuit to add the reduced relative delay to the output of the digital marker signal to output the digital marker signal at the predetermined position in time with respect to the output of the data signal.

5. The method of claim 1, wherein said programming a marker delay circuit to delay the output of the digital marker signal to output the digital marker signal at a predetermined position with respect to the output of the data signal, based on the determined relative delay, comprises receiving a user input to program the marker delay circuit to add a desired delay to the output of the digital marker signal to output the digital marker signal at the predetermined position in time with respect to the output of the data signal.

6. The method of claim 1, wherein the data signal is output in analog form.

7. The method of claim 1, where in the data signal is output in digital form.

8. The method of claim 1, further comprising:
    sensing a temperature associated with one or more delay elements associated with at least one of the travel paths of the digital marker signal and the data signal to adjust the relative delay based on the sensed temperature.

9. The method of claim 1, wherein the relative delay between the digital marker signal and the data signal is dependent upon at least one or more of:
    delays associated with one or more analog filters;
    delays associated with one or more amplifiers;
    delays associated with signal paths;
    delays associated with sampling rates;
    delays associated with interpolation rates of one or more DACs;
    delays associated with output terminals; and
    delays associated with one or more FFGAs.

10. The method of claim 1, further comprising:
    asserting a status notification bit associated with the digital marker signal to notify a user about an occurrence of the digital marker signal.

11. The method of claim 10, further comprising:
    programming a status notification delay circuit to delay assertion of the status notification bit.

12. The method of claim 1, wherein said determining a relative delay between the digital marker signal and the data signal based upon a travel path of the digital marker signal and a travel path of the data signal comprises automatically determining a total path delay associated with the data signal.

13. The method of claim 12, wherein said determining a relative delay between the digital marker signal and the data signal based upon a travel path of the digital marker signal and a travel path of the data signal farther comprises automatically determining a total path delay associated with the digital marker signal.

14. The method of claim 13, wherein said determining a relative delay between the digital marker signal and the data signal based upon a travel path of the digital marker signal and a travel path of the data signal farther comprises automatically determining the relative delay by calculating the difference between the total path delay associated with the data signal and the total path delay associated with the digital marker signal.

15. The method of claim 13, wherein said automatically determining the total path delay associated with the digital marker signal comprises detecting a fixed path delay and a variable path delay associated with the travel path of the digital marker signal.

16. The method of claim 12, wherein said automatically determining the total path delay associated with the data signal comprises determining a variable path delay associated with the travel path of the data signal.

17. The method of claim 16, wherein said automatically determining the total path delay associated with the data signal further comprises determining a fixed path delay associated with the travel path of the data signal.

18. The method of claim 17, wherein said automatically determining the total path delay associated with the data signal further comprises calculating the total path delay associated with the data signal using the fixed path delay and the variable path delay.

19. A waveform generator, comprising:
   first circuitry for generating a data signal as an output of the waveform generator;
   second circuitry for generating a digital marker signal, wherein the digital marker signal indicates a predetermined position with respect to the output of the data signal;
   a delay determining unit operable to determine a relative delay between the digital marker signal and the data signal based upon a travel path of the digital marker signal and a travel path of the data signal; and
   a marker delay circuit configured to be programmed to delay output of the digital marker signal to output the digital marker signal at a predetermined position with respect to the output of the data signal, based on the determined relative delay.

20. The apparatus of claim 19, wherein the marker delay circuit is configured to be automatically programmed to add the relative delay to the output of the digital marker signal to automatically align the output of the digital marker signal in time with respect to the output of the data signal.

21. The apparatus of claim 19, wherein the delay determining unit is operable to receive a user input indicating an additional delay and to program the marker delay circuit to add the determined relative delay plus the additional delay to the output of the digital marker signal to output the digital marker signal at the predetermined position in time with respect to the output of the data signal.

22. The apparatus of claim 19, wherein the delay determining unit is operable to receive a user input reducing the determined relative delay and to program the marker delay circuit to add the reduced relative delay to the output of the digital marker signal to output the digital marker signal at the predetermined position in time with respect to the output of the data signal.

23. The apparatus of claim 19, wherein the travel path of the data signal is separate from the travel path of the digital marker signal.

24. The apparatus of claim 19, wherein the delay determining unit is operable to automatically determine a total path delay associated with the data signal.

25. The apparatus of claim 24, wherein the delay determining unit is also operable to automatically determine a total path delay associated with the digital marker signal.

26. The apparatus of claim 25, wherein the delay determining unit is also operable to automatically determining the relative delay by calculating the difference between the total path delay associated with the data signal and the total path delay associated with the digital marker signal.

27. The apparatus of claim 25, wherein said automatically determining the total path delay associated with the digital marker signal comprises the delay determining unit detecting a fixed path delay and a variable path delay associated with the travel path of the digital marker signal.

28. The apparatus of claim 24, wherein said automatically determining the total path delay associated with the data signal comprises the delay determining unit determining a variable path delay associated with the travel path of the data signal.

29. The apparatus of claim 28, wherein said automatically determining the total path delay associated with the data signal further comprises the delay determining unit determining a fixed path delay associated with the travel path of the data signal.

30. The apparatus of claim 29, wherein said automatically determining the total path delay associated with the data signal farther comprises the delay determining unit calculating the total path delay associated with the data signal using the determined fixed path delay and the determined variable path delay.

31. A method for delaying output of a first data signal provided by a first waveform generator with respect to output of a second data signal provided by a second waveform generator, the method comprising:
   determining a relative delay between the first data signal provided by the first waveform generator and the second data signal provided by the second waveform generator, based upon a travel path of the first data signal and a travel path of the second data signal; and
   programming a data pipeline delay circuit, based on the determined relative delay, to delay the output of the first data signal to output the first data signal at a predetermined position with respect to the output of the second data signal.

32. The method of claim 31, wherein said programming a data pipeline delay circuit, based on the determined relative delay, to delay the output of the first data signal to output the first data signal at a predetermined position with respect to the output of the second data signal comprises automatically programming the data pipeline delay circuit to add the relative delay to the output of the first data signal to automatically align the output of the first data signal with respect to the output of the second data signal.

33. The method of claim 31, wherein the relative delay between the first data signal provided by the first waveform generator and the second data signal provided by the second waveform generator is dependent upon at least one or more of:
   delays associated with one or more analog filters;
   delays associated with one or more amplifiers;
   delays associated with signal paths;
   delays associated with sampling rates;
   delays associated with interpolation rates of one or more DACs;
   delays associated with output terminals; and
   delays associated with one or more FFGAs.

34. The method of claim 31, wherein said programming a data pipeline delay circuit, based on the determined relative delay, to delay the output of the first data signal to output the first data signal at a predetermined position with respect to the output of the second data signal comprises receiving a user input indicating an additional delay to program the data pipeline delay circuit to add the determined relative delay plus the additional delay to the output of the first data signal to output the first data signal at the predetermined position with respect to the output of the second data signal.

35. The method of claim 31, wherein said programming a data pipeline delay circuit, based on the determined relative delay, to delay the output of the first data signal to output the first data signal at a predetermined position with respect to the output of the second data signal comprises receiving a user input reducing the determined relative delay to program the data pipeline delay circuit to add the reduced relative delay to the output of the first data signal to output the first data signal at a predetermined position with respect to the output of the second data signal.

36. The method of claim 31, wherein said programming a data pipeline delay circuit, based on the determined relative delay, to delay the output of the first data signal to output the first data signal at a predetermined position with respect to the output of the second data signal comprises receiving a user input to program the data pipeline delay circuit to add a desired delay to the output of the first data signal to output the first data signal at a predetermined position with respect to the output of the second data signal.

37. The method of claim 31, wherein said determining a relative delay between the first data signal provided by the first waveform generator and the second data signal provided by the second waveform generator, based upon a travel path of the first data signal and a travel path of the second data signal, comprises automatically determining a total path delay associated with the first data signal provided by the first waveform generator.

38. The method of claim 37, wherein said determining a relative delay between the first data signal provided by the first waveform generator and the second data signal provided by the second waveform generator, based upon a travel path of the first data signal and a travel path of the second data signal, further comprises automatically determining a total path delay associated with the second data signal provided by the second waveform generator.

39. The method of claim 38, wherein said determining a relative delay between the first data signal provided by the first waveform generator and the second data signal provided by the second waveform generator, based upon a travel path of the first data signal and a travel path of the second data signal, further comprises automatically determining the relative delay by calculating the difference between the total path delay associated with the first data signal and the total path delay associated with the second data signal.

40. The method of claim 37, wherein said automatically determining the total path delay associated with the first data signal comprises determining a variable path delay associated with the travel path of the first data signal.

41. The method of claim 40, wherein said automatically determining the total path delay associated with the first data signal further comprises determining a fixed path delay associated with the travel path of the first data signal.

42. The method of claim 41, wherein said automatically determining the total path delay associated with the first data signal further comprises calculating the total path delay associated with the first data signal using the determined fixed path delay and the determined variable path delay.

43. A system, comprising:
a first waveform generator;
a second waveform generator coupled to the first waveform generator;
a delay determining unit operable to determine a relative delay between the first data signal provided by the first waveform generator and the second data signal provided by the second waveform generator, based upon a travel path of the first data signal and a travel path of the second data signal; and
a data pipeline delay circuit to be programmed, based on the determined relative delay, to delay the output of the first data signal to output the first data signal at a predetermined position with respect to the output of the second data signal.

44. The system of claim 43, wherein the data pipeline delay circuit is configured to be automatically programmed to add the relative delay to the output of the first data signal to automatically align the output of the first data signal with respect to the output of the second data signal.

45. The system of claim 43, wherein the delay determining unit is operable to receive a user input indicating an additional delay to program the data pipeline delay circuit to add the determined relative delay plus the additional delay to the output of the first data signal to output the first data signal at the predetermined position with respect to the output of the second data signal.

46. The system of claim 43, wherein the delay determining unit is operable to receive a user input reducing the determined relative delay to program the data pipeline delay circuit to add the reduced relative delay to the output of the first data signal to output the first data signal at a predetermined position with respect to the output of the second data signal.

47. The system of claim 43, wherein the delay determining unit is also operable to automatically determine a total path delay associated with the first data signal provided by the first waveform generator.

48. The system of claim 47, wherein the delay determining unit is further operable to automatically determine a total path delay associated with the second data signal provided by the second waveform generator.

49. The system of claim 48, wherein the delay determining unit is further operable to automatically determine the relative delay by calculating the difference between the total path delay associated with the first data signal and the total path delay associated with the second data signal.

50. The system of claim 47, wherein automatically determine a total path delay associated with the first data signal provided by the first waveform generator comprises the delay determining unit determining a variable path delay associated with the travel path of the first data signal.

51. The system of claim 50, wherein automatically determine a total path delay associated with the first data signal provided by the first waveform generator further comprises the delay determining unit determining a fixed path delay associated with the travel path of the first data signal.

52. The system of claim 51, wherein automatically determine a total path delay associated with the first data signal provided by the first waveform generator further comprises the delay determining unit calculating the total path delay associated with the first data signal using the determined fixed path delay and the determined variable path delay.

* * * * *